(12) United States Patent
Hajji et al.

(10) Patent No.: US 10,954,371 B2
(45) Date of Patent: Mar. 23, 2021

(54) POLYMER COMPOSITION COMPRISING INORGANIC COMPOUND AND POLYMERIC IMPACT MODIFIER AND A PROCESS FOR PREPARING THE SAME

(71) Applicant: Arkema France, Colombes (FR)

(72) Inventors: Philippe Hajji, Chatillon d'Azergues (FR); Rosangela Pirri, Montardon (FR); Alexandre Vermogen, Soucieu en Jarrest (FR)

(73) Assignee: Arkema France, Colombes (FR)

( * ) Notice: Subject to any disclaimer, the term of this patent is extended or adjusted under 35 U.S.C. 154(b) by 38 days.

(21) Appl. No.: 16/306,910

(22) PCT Filed: Jun. 7, 2017

(86) PCT No.: PCT/EP2017/063844
§ 371 (c)(1),
(2) Date: Dec. 4, 2018

(87) PCT Pub. No.: WO2017/211889
PCT Pub. Date: Dec. 14, 2017

(65) Prior Publication Data
US 2019/0177524 A1    Jun. 13, 2019

(30) Foreign Application Priority Data

Jun. 7, 2016   (FR) ..................................... 1655201

(51) Int. Cl.
| | | |
|---|---|---|
| C08L 51/00 | (2006.01) | |
| C08J 3/22 | (2006.01) | |
| C08J 5/18 | (2006.01) | |
| C08L 27/06 | (2006.01) | |
| C08K 3/26 | (2006.01) | |
| C08F 265/06 | (2006.01) | |
| C08J 3/21 | (2006.01) | |
| C08L 33/10 | (2006.01) | |

(52) U.S. Cl.
CPC ............ *C08L 27/06* (2013.01); *C08F 265/06* (2013.01); *C08J 3/212* (2013.01); *C08J 3/226* (2013.01); *C08J 5/18* (2013.01); *C08K 3/26* (2013.01); *C08L 33/10* (2013.01); *C08L 51/003* (2013.01); *C08F 2800/20* (2013.01); *C08J 2327/06* (2013.01); *C08J 2433/10* (2013.01); *C08K 2003/265* (2013.01); *C08L 2203/14* (2013.01); *C08L 2203/16* (2013.01); *C08L 2203/18* (2013.01); *C08L 2205/025* (2013.01); *C08L 2205/03* (2013.01); *C08L 2205/035* (2013.01); *C08L 2207/53* (2013.01); *C08L 2310/00* (2013.01)

(58) Field of Classification Search
CPC ........................... C08K 2003/265; C08K 3/26
See application file for complete search history.

(56) References Cited

U.S. PATENT DOCUMENTS

| | | |
|---|---|---|
| 3,373,229 A | 3/1968 | Philpot et al. |
| 2006/0008642 A1 | 1/2006 | Marot et al. |
| 2009/0111915 A1 | 4/2009 | Lavallee et al. |
| 2011/0305862 A1 | 12/2011 | Rachwal |
| 2017/0037235 A1 | 2/2017 | Lavach et al. |

FOREIGN PATENT DOCUMENTS

WO    WO 2007/093565 A1    8/2007

*Primary Examiner* — Jeffrey C Mullis
(74) *Attorney, Agent, or Firm* — Lynn B. Morreale

(57) ABSTRACT

The present invention relates to a polymeric composition comprising an impact modifier and a mineral filler and its process of preparation and its use. In particular, the present invention relates to a polymeric composition comprising an impact modifier and a mineral filler and its use for thermoplastic polymers. More particularly the present invention relates to the process of preparation of polymeric composition comprising an impact modifier and a mineral filler and its use for the impact modification of thermoplastic polymers.

19 Claims, No Drawings

POLYMER COMPOSITION COMPRISING INORGANIC COMPOUND AND POLYMERIC IMPACT MODIFIER AND A PROCESS FOR PREPARING THE SAME

CROSS-REFERENCE TO RELATED APPLICATIONS

This application is a national stage application under 35 U.S.C. § 371 of PCT/EP2017/063844, filed Jun. 7, 2017 which claims benefit to application FR 16 55201, filed Jun. 7, 2016.

FIELD OF THE INVENTION

The present invention relates to a polymeric composition comprising an impact modifier and a mineral filler and its process of preparation and its use.

In particular the present invention relates to a polymeric composition comprising an impact modifier and a mineral filler and its use for thermoplastic polymers.

More particularly the present invention relates to the process of preparation of polymeric composition comprising an impact modifier and a mineral filler and its use for the impact modification of thermoplastic polymers.

BACKGROUND OF THE INVENTION

Technical Problem

Many kind of additives and fillers are used in thermoplastic polymer compositions in general and in halogenated polymer compositions in particular for a large variety of reasons. They can extend the composition, increase stiffness and strength, and shorten cycle times. They prevent hang-up in dies and neutralize the products of degradation. Fillers can also be used to add color, opacity and conductivity or they can be used as a low cost material that lowers the cost of the composition as the filler is less expensive than the other ingredients of the formulation.

However the addition of additives and filler to thermoplastic polymers, especially when several are added at the same time or mixtures of them, can also change characteristics of that thermoplastic polymer composition in a negative direction, meaning loss or important decrease of certain characteristic or behavior.

Polymer compositions comprising polymers with specific characteristic (such as polymer composition, glass transition temperature or structure for naming some characteristics) are also used as additives for thermoplastic polymer compositions in general and in halogenated polymer compositions in particular in order to improve the impact resistance of the composition or object made out of these various polymers or plastic resin. Therefor these additives are also called impact modifiers.

The additive polymer composition is compatible with thermoplastic polymer compositions in general and in halogenated polymer compositions in particular.

Afterwards the thermoplastic polymer compositions in general and in halogenated polymer compositions in particular comprising the additives are processed and/or transformed.

The processed and transformed composition are made in polymeric articles or are used as polymeric part in an article.

The objective of the present invention is to propose a polymeric composition which can be added to thermoplastic polymers as an additive.

An objective of the present invention is also to have a polymer composition that can be used to increase the impact strength of thermoplastic polymers.

Another objective of the present invention is also to have a polymer composition that can be used to increase the performance of extruded thermoplastic polymers.

An additional objective of the present invention is the reduction of the price of a polymer composition which acts as impact modifier for thermoplastic polymer compositions by addition of low cost components without negatively influencing the performance of the thermoplastic polymer compositions.

Prior Art

The document US 2009/0111915 discloses acrylic copolymers for use in highly filled compositions. In particular the document disclosed filled polyvinylchloride (PVC) materials as a composition for flooring comprising 70 wt % to 95 wt % filler, 1 wt % to 15 wt % PVC and 0.5 wt % to 4 wt % of acrylic copolymer or a composition for siding or pipe comprising 15 wt % to 35 wt % filler, 50 wt % to 95 wt % PVC and 0.25 to 6 wt % of acrylic copolymer.

The document WO 2010/099160 discloses composite polymer modifiers. The document discloses a composite polymer modifier consisting of 99 wt % to 1 wt % of inorganic filler and from 1 wt % to 99 wt % of a polymeric processing aid and 0 wt % to 80% of an impact modifier. The impact modifier is optional, however used in some examples. This document discloses no specific advantages about certain impact modifier compositions.

The document WO2007/093565 discloses a hybrid impact modifier comprising an impact modifier and a mineral filler. The document tries to solve the segregation of different components throughout of a powder composition and discloses and claims especially 3 to 20 wt % of mineral filler.

None of the prior art documents discloses such a specific composition as the present invention.

BRIEF DESCRIPTION OF THE INVENTION

Surprisingly it has been found that a polymer composition P1 comprising
 a) from 29 wt % to 60 wt % of an inorganic compound (F),
 b) from 40 wt % 71 wt % of a polymeric impact modifier (IM1);
characterized that the two components of a) and b) add up to 100 wt %, increases the impact resistance of thermoplastic polymers while still having an acceptable fusion time and yields to a better heat dissipation during the cooling of high speed processing.

Surprisingly it has also been found that a process for preparing a polymer composition P1 comprising
 a) from 29 wt % to 60 wt % of an inorganic compound (F),
 b) from 40 wt % 71 wt % a polymeric impact modifier (IM1);
characterized that the two components of a) and b add up to 100 wt %, said process comprises the step of
 blending the two components of a) and b), while the component of b) and at least 83.33 wt % of compound of a) are in form of a dispersion in aqueous phase during the blending step;
yields to a polymer composition that increases the impact resistance of thermoplastic polymers while still having an acceptable fusion time and yields to a better heat dissipation during the cooling of high speed processing.

Surprisingly it has also been found that a process for preparing a polymer composition P1 comprising
  a) from 29 wt % to 60 wt % of an inorganic compound (F),
  b) from 40 wt % 71 wt % of a polymeric impact modifier (IM1);
characterized that the two components of a) and b add up to 100 wt %, said process comprises the step of
  i) blending the two components of a) and b), while the component of b) and at least 83.33 wt % of compound of a) are in form of a dispersion in aqueous phase during the blending step;
  ii) drying the blend obtained in step i);
yields to a polymer composition that increases the impact resistance of thermoplastic polymers while still having an acceptable fusion time and yields to a better heat dissipation during the cooling of high speed processing.

Surprisingly it has also been found that a polymer composition P1 comprising
  a) from 29 wt % to 60 wt % of an inorganic compound (F),
  b) from 40 wt % 71 wt % of a polymeric impact modifier (IM1);
characterized that the two components of a) and b) add up to 100 wt %, can be used to increase the impact strength and the corner weld strength of thermoplastic polymers.

DETAILED DESCRIPTION OF THE INVENTION

According to a first aspect, the present invention relates to a polymer composition P1 comprising
  a) from 29 wt % to 60 wt % of an inorganic compound (F),
  b) from 40 wt % 71 wt % of a polymeric impact modifier (IM1);
characterized that the two components of a) and b) add up to 100 wt %.

According to a second aspect, the present invention relates to a polymer composition P1 comprising
  a) from 29 wt % to 60 wt % of an inorganic compound (F), said inorganic compound (F) consists of a mineral filler (F1) and a flow aid (F2), wherein the weight ratio (F1)/(F2) is at least 5/1,
  b) from 40 wt % 71 wt % of a polymeric impact modifier (IM1);
characterized that the two components of a) and b) add up to 100 wt %.

In a third aspect the present invention relates to a process for preparing a polymeric composition P1 comprising
  a) from 29 wt % to 60 wt % of an inorganic compound (F)
  b) from 40 wt % 71 wt % of a polymeric impact modifier (IM1);
characterized that the two components of a) and b) add up to 100 wt %, said process comprises the step of
  blending the two components of a) and b), while the component of b) and at least 83.33 wt % of compound of a) are in form of a dispersion in aqueous phase during the blending step.

In a fourth aspect the present invention relates to a process for preparing a polymeric composition P1 comprising
  a) from 29 wt % to 60 wt % of an inorganic compound (F) said inorganic compound (F) consists of a mineral filler (F1) and a flow aid (F2), wherein the weight ratio (F1)/(F2) is at least 5/1,
  b) from 40 wt % 71 wt % of a polymeric impact modifier (IM1);
characterized that the two components of a) and b) add up to 100 wt %, said process comprises the step of
  blending the two components of a) and b), while the component of b) and mineral filler (F1) are in form of a dispersion in aqueous phase during the blending step.

In a fifth aspect the present invention relates to a process for preparing a polymeric composition P1 comprising
  a) from 29 wt % to 60 wt % of an inorganic compound (F),
  b) from 40 wt % 71 wt % of a polymeric impact modifier (IM1);
characterized that the two components of a) and b) add up to 100 wt %, said process comprises the step of
  i) blending the two components of a) and b), while the component of b) and at least 83.33 wt % of compound a) are in form of a dispersion in aqueous phase during the blending step,
  ii) drying the blend obtained in step i).

In a sixth aspect the present invention relates to a process for preparing a polymeric composition P1 comprising
  a) from 29 wt % to 60 wt % of an inorganic compound (F) said inorganic compound (F) consists of a mineral filler (F1) and a flow aid (F2), wherein the weight ratio (F1)/(F2) is at least 5/1,
  b) from 40 wt % 71 wt % of a polymeric impact modifier (IM1);
characterized that the two components of a) and b) add up to 100 wt %, said process comprises the step of
  i) blending the components a) and b) while the component of b) and mineral filler (F1) are in form of a dispersion in aqueous phase during the blending step.
  ii) drying the blend obtained in step i).

In a seventh aspect the present invention relates to a process for preparing a polymeric composition P2 comprising polymer composition P1, said polymer composition P1 comprises
  a) from 29 wt % to 60 wt % of an inorganic compound (F)
  b) from 40 wt % 71 wt % of a polymeric impact modifier (IM1),
characterized that the two components of a) and b) add up to 100 wt %, and the said polymeric composition P2 comprises also
  d) a thermoplastic polymer TP1 said process comprises the step of
    blending the compositions P1 and the thermoplastic polymer TP1.

In an eighth aspect the present invention relates to the use of a polymeric composition P1 comprising
  a) from 29 wt % to 60 wt % of an inorganic compound (F)
  b) from 40 wt % 71 wt % of a polymeric impact modifier (IM1),
characterized that the two of a), and b) add up to 100 wt %, for increasing the corner weld strength of a thermoplastic polymer TP1 comprising said polymeric composition P1.

By the term "polymeric composition" as used is denoted that the composition consists of polymers of at least 40 wt %.

By the term "copolymer" as used is denoted that the polymer consists of at least two different monomers.

By the term "(meth)acrylic" in combination with monomers as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer By the term "polymer powder" as used is denoted a polymer comprising powder grain in the range of at least 1 micrometer (μm) obtained by agglomeration of primary polymer comprising particles in the nanometer range.

By the term "primary particle" as used is denoted a spherical shape polymer comprising particle in the nanometer range. Preferably the primary particle has a weight average particle size between 20 nm and 500 nm.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer.

By the term "dispersion" as used is denoted a colloidal system with a continuous liquid phase and a discontinuous solid phase that is distributed throughout the continuous phase.

By the term "emulsion" as used is denoted a liquid/liquid mixture of a liquid discontinuous phase in a liquid continuous phase.

By the term "PVC" as used is understood polyvinyl chloride in form of homopolymer or copolymer comprising at least 50 wt % of vinyl chloride.

By the term "filler" as used is understood a solid extender added to a polymer in order to enhance properties and/or reduce costs.

By the term "flow aid" as used is understood an anti-caking agent, that allows a good flow ability of the powder and avoids caking.

By the abbreviation "phr" is meant parts per hundred parts of resin. For example 15 phr of filler in a PVC formulation means that 15 kg of filler are added to 100 kg of PVC.

By "that the two components of a) and b) add up to 100 wt %" as used, is meant that the ratio of the two components of a) and b) is only calculated from the sum of these two components. If there are other additional components outside of a) and b), they are not taken into account for the calculation of the weight ratio between the two of them.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less then y.

With regard to the polymeric composition P1 of the present invention, it comprises at least two components a) from 29 wt % to 60 wt % of an inorganic compound (F), b) from 40 wt % to 71 wt % a polymeric impact modifier (IM1).

The component b) could also be a mixture of several polymeric impact modifiers (IM1) to (IMx). In that case the sum of the respective polymeric impact modifiers in the polymeric composition is from 40 wt % to 71 wt %. Each polymeric impact modifier is having a specific different characteristic, as for example composition or morphology.

Said inorganic compound (F) consists of a mineral filler (F1) and a flow aid (F2), wherein the weight ratio (F1)/(F2) is at least 5/1.

Preferably the polymeric composition P1 comprises a) between 29 wt % and 60 wt % of an inorganic compound (F) and b) between 40 wt % and 71 wt % of polymeric impact modifier (IM1).

More preferably the composition P1 of the present invention comprises a) between 31 wt % and 59 wt % of an inorganic compound (F) and b) between 41 wt % and 69 wt % of polymeric impact modifier (IM1). Still more preferably the composition P1 of the present invention comprises a) between 33 wt % and 58 wt % of an inorganic compound (F) and b) between 42 wt % and 67 wt % of polymeric impact modifier (IM1) and again still more preferably the composition of the present invention comprises a) between 35 wt % and 55 wt % of an inorganic compound (F) and b) between 45 wt % and 65 wt % of polymeric impact modifier (IM1).

Advantageously the composition P1, of the present invention comprises a) between 40 wt % and 55 wt % of an inorganic compound (F) and b) between 45 wt % and 60 wt % of polymeric impact modifier (IM1), more advantageously a) between 40 wt % and 54 wt % of an inorganic compound (F) and b) between 46 wt % and 60 wt % of polymeric impact modifier (IM1) and most advantageously a) between 40 wt % and 52 wt % of an inorganic compound (F) and b) between 48 wt % and 60 wt % of polymeric impact modifier (IM1).

In one specific embodiment the composition P1 of the present invention comprises a) between 42 wt % and 47 wt % of an inorganic compound (F) and b) between 53 wt % and 58 wt % of polymeric impact modifier (IM1).

The polymeric composition P1 according to the invention is preferably in form of a powder comprising the two components. The powder is composed of grains of aggregated particles of the two components. These particles are the primary particles.

With regard to the polymer powder of the invention, it has a volume median particle size D50 between 1 μm and 500 μm. Preferably the volume median particle size of the polymer powder is between 10 μm and 450 μm, more preferably between 15 μm and 400 μm and advantageously between 20 μm and 350 μm.

The D10 of the particle size distribution in volume is at least 7 μm and preferably 10 μm.

The D90 of the particle size distribution in volume is at most 800 μm and preferably at most 500 μm.

The powder according to the invention is homogenous in view of the composition concerning the two components.

Homogeneous in the present invention signifies no important variation throughout the composition. If one or several small samples (1 g or less) is/are taken from a larger quantity (1 kg) of the composition there is no important variation of the composition concerning the weight ratio of the two respective components in the small sample in comparison to other small samples and the global composition of P1. By small sample is meant 0.1 wt % or less of the polymeric composition. By no important variation is meant that the variation is less than 30% relative to the global composition. As an example, if the global composition P1 comprises 40 wt % of the inorganic compound (F) and 60 wt % of the polymeric impact modifier (IM1), a small first sample taken from the global composition that would comprise 35% wt of the inorganic compound (F) and 65 wt % of the polymeric impact modifier (IM1) or small second sample taken from the global composition that would comprise 42% wt of the inorganic compound (F) and 58 wt % of the polymeric impact modifier (IM1), would signify a homogenous composition as the variation of ratio of the respective components throughout the small samples is within the 30% variation in view of the global composition of the sample.

Preferably the variation of the components within the composition is less than 25%, more preferably less than 20%.

In an ideal case each powder particle or grain comprises all two components a) and b) and is composed of aggregated particles of the two components. The variation of the weight ratio of the two components in a single powder particle or grain could be more important than the variation in the before described small sample.

The polymer composition P1 according to the present invention which is preferably in form of a powder, is more preferably a dry powder. By dry is meant that the powder has a certain maximum level of humidity.

The dry polymer composition P1 in form of a powder according to the present invention comprises less than 3 wt % humidity and preferably less than 1.5 wt % humidity and more preferably less than 1.2 wt % humidity. The humidity of a polymer composition can be measure with a thermo balance.

The dry polymer composition P1 in form of a powder according to the present invention can comprise additionally a flow aid (F2). The flow aid (F2) is preferably an inorganic compound. Therefore the flow aid (F2) is part of the inorganic compound (F) of the composition P1. The inorganic compound (F) is consisting of the flow aid (F2) and an inorganic filler (F1): (F)=(F1)+(F2) The quantity of the flow aid (F2) is much less important in the polymer composition P1 than the inorganic filler (F1). The quantity of (F1) is at least 5 times more important than the quantity of (F2)

The density of the polymer composition P1 is at least 1.25 g/cm3, preferably at least 1.3 g/cm3 and more preferably at least 1.33 g/cm3.

The density of the polymer composition P1 is at most 1.75 g/cm3, preferably at most 1.7 g/cm3 and more preferably at most 1.67 g/cm3.

Advantageously the density of the polymer composition P1 is between 1.25 g/cm3 and 1.75 g/cm3, and more advantageously between 1.3 g/cm3 and 1.7 g/cm3.

With regard to the inorganic compound (F) it is either an inorganic filler or mineral filler (F1) or it comprises both an inorganic filler or mineral filler (F1) and a flow aid (F2).

Preferably the inorganic compound (F) comprises of a mineral filler (F1) and a flow aid (F2). More preferably the weight ratio (F1)/(F2) is at least 5/1.

With regard to the mineral filler (F1), mention may be made of glass fibers, hollow glass microspheres, inorganic compounds, such as minerals and salts including calcium carbonate ($CaCO_3$), silica, silicates such as calcium silicate or metasilicate, clay such as bentonite, mica, talc, alumina trihydrate, magnesium hydroxide, metal oxides, or combinations of two or more thereof.

Preferably the mineral filler (F1) is chosen from calcium carbonate, titanium dioxide or calcinated clay, silica (fumed or precipitated), clay, Montmorillonite (nano-clay), zeolite, perlite or any other type of inorganic material that can be obtained as a slurry.

More preferably the mineral filler (F1) is chosen from calcium carbonate, calcinated clay, silica (fumed or precipitated), clay, Montmorillonite (nano-clay), zeolite or perlite.

The mineral filler (F1) of the inorganic compound (F) could also be a mixture of several mineral fillers (F1a) to (F1x).

In a still more preferred embodiment the mineral filler (F1) is calcium carbonate (CaCO3).

Advantageously the calcium carbonate is chosen from precipitated calcium carbonate (PCC), grinded natural calcium carbonate (GCC) or nanosized particles of precipitated calcium carbonate (NPCC).

The mineral filler (F1) or at least a part of the mineral filler (F1) could also be in form of a slurry for the process for preparing the polymeric composition P1.

Preferably the filler (F1) or at least a part of the mineral filler (F1), that is blended with the polymeric impact modifier (IM1), is in form of a slurry.

As regards the slurry of the mineral filler, it is a water dispersion of a mineral filler with solid content preferably between 5 wt % and 90 wt % and advantageously between 50 wt % and 80 wt %. This water dispersion can contain any specific surfactant, dispersing agent, additive or filler surface treatment that can advantageously improve the quality of the slurry (stability, viscosity or compatibility with the host polymer matrix).

With regard to the flow aid (F2) it is an inorganic powder.

The flow aid (F2) could also be a mixture of several flow aid (F2a) to (F2x).

Advantageously the flow aid (F2) is chosen from calcium carbonate (CaCO3).

With regard to the polymeric impact modifier (IM1), it is preferably a polymer particle having a multilayer structure.

The polymer particle having a multilayer structure is more or less spherical shape. The polymer particle has a weight average particle size (diameter) between 20 nm and 500 nm. Preferably the weight average particle size of the polymer particle is between 50 nm and 400 nm, more preferably between 75 nm and 350 nm and advantageously between 80 nm and 300 nm.

The polymer particle according to the invention is obtained by a multistage process such as two or three stages or more stages, each stage yield to a layer, the whole process yields to a particle with a multilayer structure The polymeric impact modifier (IM1) in form of the polymeric particle having a multilayer structure comprising at least one layer (IM1L1) comprising a polymer L1) having a glass transition temperature below 0° C. and at least another layer (IM1L2) comprising a polymer L2) having a glass transition temperature over 45° C.

More preferably the glass transition temperature Tg of the polymer L1) is between −100° C. and 0° C., even more preferably between −80° C. and 0° C. and advantageously between −80° C. and −20° C. and more advantageously between −70° C. and −20° C.

Preferably the glass transition temperature Tg of the polymer L2) is between 60° C. and 150° C. The glass transition temperature of the polymer L2) is more preferably between 80° C. and 140° C., advantageously between 90° C. and 135° C. and more advantageously between 90° C. and 130° C.

In order to obtain a sample of the respective polymers L1) and L2) they can be prepared alone, and not by a multistage process, for estimating and measuring more easily the glass transition temperature Tg individually of the respective polymers of the respective stages.

The weight ratio of layer (IM1L1)/layer (IM1L2) in the multistage polymer is preferably at least 70/30, more preferably at least 80/20, even more preferably at least 85/15, advantageously at least 86/14, more advantageously 87/13, even more advantageously 88/12 and most advantageously 89/11.

The weight ratio of layer (IM1L1)/layer (IM1L2) in the multistage polymer is preferably in a range by weight between 70/30 and 99/1, more preferably between 80/20 and 98/2, even more preferably between 85/15 and 97/3, advantageously between 86/14 and 97/3, more advantageously between 87/13 and 97/2, even more advantageously between 88/11 and 96/4 and most advantageously between 89/11 to 96/4.

Preferably the polymer L1 presents more than 85 wt % of the polymeric impact modifier (IM1) and more preferably more than 86 wt %.

The multi-layer structure of IM1 can have different structures. The layer (IM1L1) comprising a polymer L1) having a glass transition temperature below 0° C., can be the core of the polymeric impact modifier (IM1) or an intermediate layer, but never the most outer layer. The layer (IM1L2) comprising a polymer L2) having a glass transition temperature over 45° C. can be the most outermost layer.

The layer (IM1L2) comprising a polymer L2) is preferably a (meth) acrylic copolymer comprising at least 50 wt % of polymeric units coming from methyl methacrylate.

In a first preferred embodiment of (IM1), the polymer L1) having a glass transition temperature below 0° C. is a (meth) acrylic polymer comprising at least 50 wt % of monomers from alkyl acrylates. Preferably the polymer L2) or the majority of the polymer L2) of the layer (IM1L2) is grafted on the layer situated below.

More preferably the polymer L1) comprises a comonomer or comonomers which are copolymerizable with alkyl acrylate, as long as polymer (A1) is having a glass transition temperature of less than 0° C.

The comonomer or comonomers in polymer L1) are preferably chosen from (meth)acrylic monomers and/or vinyl monomers.

The (meth)acrylic comonomer in polymer L1) comprises monomers chosen from C1 to C12 alkyl (meth)acrylates. Still more preferably (meth)acrylic comonomer in polymer L1) comprises monomers of C1 to C4 alkyl methacrylate and/or C1 to C8 alkyl acrylate monomers.

Most preferably the acrylic or methacrylic comonomers of the polymer L1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer L1) is having a glass transition temperature of less than 0° C.

Preferably the polymer (A1) is crosslinked. This means that a crosslinker is added to the other monomer or monomers. A crosslinker comprises at least two groups that can be polymerized.

In one specific embodiment polymer L1) is a homopolymer of butyl acrylate.

In another specific embodiment polymer L1) is a copolymer of butyl acrylate and at least one crosslinker. The crosslinker presents less than 5 wt % of this copolymer.

More preferably the glass transition temperature Tg of the polymer L1) of the first embodiment is between −100° C. and 0° C., even more preferably between −100° C. and −5° C., advantageously between −90° C. and −15° C. and more advantageously between −90° C. and −25° C.

In a second preferred embodiment the polymer L1) having a glass transition temperature below 0° C. comprises at least 50 wt % of polymeric units coming from isoprene or butadiene and the stage or layer (IML1) is the most inner layer of the polymer particle having the multilayer structure. In other words the stage for making the layer (IM1L1) comprising a polymer L1) is the core of the polymer particle.

By way of example, the polymer L1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In one embodiment the core is a butadiene homopolymer.

More preferably the glass transition temperature Tg of the polymer L1) of the second embodiment comprising at least 50 wt % of polymeric units coming from isoprene or butadiene is between −100° C. and 0° C., even more preferably between −100° C. and −5° C., advantageously between −90° C. and −15° C. and even more advantageously between −90° C. and −25° C.

With regard to the thermoplastic polymer TP1, it is chosen from halogen containing polymers, such as for example polyvinyl chloride, polyamide, polymethyl methacrylate, polystyrene, polycarbonate, polyesters such as polyethylene terephthalate, polybutylene terephthalate, polycyclohexanedimethanol terephthalate, and polyolefins.

In a first preferred embodiment the thermoplastic polymer TP1 is a halogen containing polymer.

With regard to the halogen containing polymer, mention may be made of:
  homopolymers and copolymers of vinyl chloride (PVC) and of vinylidene chloride (PVDC), vinyl resins comprising vinyl chloride units in their structure, such as copolymers of vinyl chloride, and vinyl esters of aliphatic acids, especially vinyl acetate, copolymers of vinyl chloride with esters of acrylic and methacrylic acid and with acrylonitrile, copolymers of vinyl chloride with diene compounds and unsaturated dicarboxylic acids or their anhydrides, such as copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and its copolymers with vinyl chloride and other polymerizable compounds;
  polymers of vinyl chloroacetate and dichlorodivinyl ether; chlorinated polymers of vinyl carboxylate, such as vinyl acetate, vinyl propionate, vinyl butyrate, chlorinated polymeric esters of acrylic acid and of α-substituted acrylic acid, such as methacrylic acid, of nitriles, amides, alkyl esters such as acrylonitrile, (meth)acrylamide, methyl (meth)acrylate, butyl acrylate, ethyl acrylate, 2-ethylhexyl acrylate;
  polymers of vinyl aromatic derivatives, such as styrene, dichlorostyrene; chlorinated rubbers;
  chlorinated polymers of olefins, such as ethylene, propene, 1-butene, (2.2.1)bicyclo heptene-2, (2.2.1)bicyclo hepta-diene-2,5;
  polymers and post-chlorinated polymers of chlorobutadiene and copolymers thereof with vinyl chloride, chlorinated natural and synthetic rubbers, and also mixtures of these polymers with one another or with other polymerizable compounds.
  grafted halogen containing copolymers, where the halogen containing polymer part is grafted on an (meth) acrylic homo or copolymer, in form of a particles, which could be crosslinked or not.

Preferably the halogen containing polymer is a thermoplastic polymer and not an elastomeric polymer. The glass transition temperature of the thermoplastic polymer is at least 40° C., preferably 50° C.

Preferably the halogen in the halogen containing polymer is chosen from fluorine or chlorine and advantageously the halogen is chlorine.

The chlorine containing polymer is chosen from among polymers or mixtures of polymers chosen from among homopolymer vinyl chlorides such as polyvinyl chloride, polyvinylidene chloride, chlorinated polyvinyl chloride, post-chlorinated polyvinyl chloride and copolymers formed by the polymerisation of a vinyl chloride monomer with up to 40% of a comonomer such as vinyl acetate, vinyl butyrate, vinylidene chloride, propylene, methyl methacrylate and the like, as well as chlorine-containing polymers containing other polymers such as chlorinated polyethylene, terpolymers of acrylonitrile, butadiene, styrene, terpolymers of methyl methacrylate, butadiene, styrene; polyacrylate resins, poly methyl methacrylate resins and terpolymer of alkyl acrylate, methyl methacrylate, butadiene, preferably the chlorine-containing polymer is polyvinyl chloride or post-chlorinated polyvinyl chloride.

Preferably the chlorine containing polymer is chosen from homo- and copolymers of vinyl chloride (VC); comprising at least 50 wt % of VC units, preferably at least 70 wt % of VC units, more preferably at least 80 wt % of VC units, advantageously at least 85 wt % of VC units; or mixtures thereof.

With regard to the process for preparing a polymeric composition P1 according to the present invention comprising
a) from 29 wt % to 60 wt % of an inorganic compound (F),
b) from 40 wt % to 71 wt % of a polymeric impact modifier (IM1);
characterized that the two components of a) and b) add up to 100 wt %, said process comprises the step of
blending the two components of a) and b), while the component of b) and at least 83.33 wt % of compound of a) are in form of a dispersion in aqueous phase during the blending step.

With regard to a first preferred process for preparing a polymeric composition P1 according to the present invention comprising
a) from 29 wt % to 60 wt % of an inorganic compound (F),
b) from 40 wt % to 71 wt % of a polymeric impact modifier (IM1);
characterized that the two components of a) and b) add up to 100 wt %, said process comprises the step of
i) blending the two components of a) and b), while the component of b) and at least 83.33 wt % of compound of a) are in form of a dispersion in aqueous phase during the blending step
ii) drying the blend obtained in step i).

With regard to a second preferred process for preparing a polymeric composition P1 according to the present invention comprising
a) from 29 wt % to 60 wt % of an inorganic compound (F), said inorganic compound (F) consists of a mineral filler (F1) and a flow aid (F2), wherein the weight ratio (F1)/(F2) is at least 5/1,
b) from 40 wt % to 71 wt % of a polymeric impact modifier (IM1);
characterized that the two components of a) and b) add up to 100 wt %, said process comprises the step of
blending the two components of a) and b), while the two components b) and (F1) are in form of a dispersion in aqueous phase during the blending step.

More preferably the process for preparing a polymeric composition P1 comprising
a) from 29 wt % to 60 wt % of an inorganic compound (F) said inorganic compound (F) consists of a mineral filler (F1) and a flow aid (F2), wherein the weight ratio (F1)/(F2) is at least 5/1,
b) from 40 wt % to 71 wt % of a polymeric impact modifier (IM1);
characterized that the two components of a) and b) add up to 100 wt %, said process comprises the step of
i) blending the two components of a) and b), while the two components b) and (F1) are in form of a dispersion in aqueous phase during the blending step,
ii) drying the blend obtained in step i).

Additionally the process can include additionally the step of recovering the obtained blend of previous step in order to form a polymer powder or as a polymer powder.

The quantities of the aqueous dispersion of the two components of a) and b) or (F1) are chosen on the solid content of each respective dispersion, in order to obtain the composition of polymeric composition P1 on the solid part.

The recovering step of the process for manufacturing the polymer composition according to the invention, is preferably made by coagulation or by spray drying. It is obvious that the spray drying combines the recovering and drying in one process step.

In the case of spray drying it is possible to blend or mix the respective dispersions of the components of a) and b) before adding the liquid mixture to the spray drying apparatus. It is also possible to blend or mix the dispersion inside the spray drying apparatus during the recovering step.

Spray drying is the preferred method for the recovering and/or drying for the process of preparing polymeric composition P1.

The polymeric composition P1 after drying comprises less than 3 wt % humidity and preferably less than 1.5 wt % humidity and more preferably less than 1.2 wt % humidity.

The present invention relates also to a process for preparing a polymeric composition P2 comprising polymer composition P1, said polymer composition P1 comprises
a) from 29 wt % to 60 wt % of an inorganic compound (F)
b) from 40 wt % to 71 wt % of a polymeric impact modifier (IM1);
characterized that the two components of a) and b) add up to 100 wt %, and the said polymeric composition P2 comprises also
d) a thermoplastic polymer TP1 said process comprises the step of
blending the compositions P1 and the thermoplastic polymer TP1.

Preferably in the process for preparing a polymeric composition P2, the polymer composition P1 is prepared according the process described earlier.

The inorganic compound (F), polymeric impact modifier (IM1), polymer composition P1 and thermoplastic polymer TP1 are the same as defined before.

Preferably blending the compositions P1 and the thermoplastic polymer TP1 is made by means known by one skilled in the art of blending polymeric compositions as dry blending or compounding of components then melt processed.

The ratio of the polymer composition P1 in the polymeric composition P2 is between 1 and 20 phr, preferably between 2 and 15 phr, more preferably between 3 and 12 phr and advantageously between 3 and 10 phr.

The present invention relates to the use of a polymeric composition P1 comprising
a) from 29 wt % to 60 wt % of an inorganic compound (F)
b) from 40 wt % to 71 wt % a polymeric impact modifier (IM1),
characterized that the two components of a)) and b) add up to 100 wt %, for increasing the impact strength of a thermoplastic polymer TP1 and heat dissipation during the cooling of high speed processing.

After the use, the thermoplastic polymer TP1 comprises the polymeric composition P1 and gives polymeric composition P2.

Preferably in the process for preparing a polymeric composition P2, and the polymer composition P1 is prepared according the processes described earlier.

The inorganic compound (F), the polymeric impact modifier (IM1), polymer composition P1 and thermoplastic polymer TP1 are the same as defined before.

The present invention relates to the use of a polymeric composition P1 comprising
a) from 29 wt % to 60 wt % of an inorganic compound (F)
b) from 40 wt % to 71 wt % polymeric impact modifier (IM1), characterized that the two components of a) and b) add up to 100 wt %, for increasing the corner weld strength of polymeric composition P2 that comprises said polymeric composition P1 and a thermoplastic polymer TP1.

Preferably in the process for preparing a polymeric composition P2, the polymer composition P1 is prepared according the process described earlier.

The inorganic mineral filler (F), polymeric impact modifier (IM1), polymer composition P1 and thermoplastic polymer TP1 are the same as defined before.

Preferably the transformation of polymeric composition P2 that comprises said polymeric composition P1 and a thermoplastic polymer TP1 is made by extrusion.

The polymer composition P1 is used in the polymeric composition P2 in a ratio of between 1 and 20 phr, preferably between 2 and 15 phr, more preferably between 3 and 12 phr and advantageously between 3 and 10 phr.

The polymeric composition P2 can be processed and transformed into an article.

The present invention relates also to an article comprising the polymeric composition P2 as described above. This article can be a profile, a pipe, a siding, a foam, a film, a sheet, a flooring film or sheet.

In a first preferred embodiment the article according to the invention is a profile. In one first advantageously embodiment the article according to the invention is a siding or window profile.

[Methods of Evaluation]

Glass Transition Temperature

The glass transitions (Tg) of the polymers or mixture of polymers are measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The used frequency is 1 Hz. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

For the estimation of volume average powder particle size, particle size distribution and ratio of fine particles a Malvern Mastersizer 300 apparatus with a 300 mm lenses, measuring a range from 0.5-880 μm is used. The D (v, 0.5) is the particle size at which 50% of the sample has size less then and 50% of the sample have a size larger then that size, or in other words the equivalent volume diameter at 50% cumulative volume. This size is also known as volume medium diameter (abbreviated D50) that is related to the mass or weight median diameter by the density of the particles assuming a size independent density for the particles.

Fusion Effiency

The fusion efficiency of the polymer composition is estimated by measuring the fusion time with a torque rheometer based on ASTM D2538-02 (reapproved 2010). A shorter fusion time signifies a better fusion efficiency and interpreted as a more efficient process.

Impact Strength

The British Standard BSI 2783 method was used to evaluate the single V-notch impact strength. 0.1 mm notch radius was used. Impact test were evaluated at controlled room temperature. Pendulum energy was 1J. 10 samples were used to evaluate an average impact energy with its standard deviation.

The DIN 53753 method was used to evaluate the double V-notch impact strength. 0.1 mm notch radius was used. Impact test were evaluated at controlled room temperature. Pendulum energy was 1J. 10 samples were used to evaluate an average impact energy with its standard deviation. Information on the type of failure (Ductile or Fragile) is also given.

Corner Weld Strength (CWS)

Corner welding strength resistance were evaluated using an internal method. After extrusion samples were welded at 240° C. under pressure. Specimens were then submitted to a welding resistance at controlled room temperature at 25° C. The average strength at break out of 5 specimens was evaluated.

Microscopy

Microscopy on the powder is performed with Scanning Electron Microscopy (SEM). With the detection of back scattered electrons the inorganic filler for example calcium carbonate can be easily detected in each powder grain.

EXAMPLES

Following materials are used or prepared:

A polymeric impact modifier (IM1) is prepared according to the technique described in U.S. Pat. No. 4,278,576, which employs a standard emulsion polymerization technique.

As polymeric impact modifier (IM1) a core/shell acrylic polymer impact modifier is prepared employing 89.2 parts of butyl acrylate, 0.4 parts of butylene glycol diacrylate and 0.4 parts of diallymaleate as elastomeric core, followed by a polymerization of 10 parts of methyl methacrylate. The solid content is 40% of the aqueous dispersion of (IM1a).

The inorganic mineral filler (F1) is calcium carbonate ($CaCO_3$). Slurry or dispersion of $CaCO_3$ is prepared according to the technique described in J.P. Pat. No. 59057913. Namely the slurry is obtained by mixing 270 parts of water, 0.72 parts of sodium polyacrylate and 729.3 parts of $CaCO_3$ of diam. 0.2-0.6 μm and 0.6% moisture and stirring for 20 min at shear rate 5 times 102/s. The obtained solid content is 73 wt %.

As thermoplastic polymer TP1, polyvinylchloride PVC S110P from Kemone is used.

As flow aid (F2) calcium carbonate (PCC, 0.07 micron) is used.

The sample compositions according to table 1 are prepared as polymer composition P1 or as compositions for comparative examples in form of powders.

Comparative example 1: The dispersion of (IM1) and the slurry of inorganic filler (F1) are mixed for with the following ratio, 9.11 kg (9110 parts) of dispersion and 0.705 kg (705 parts) of slurry, and spray dried in the conditions classically used for the latex dispersion alone. The obtained powder as a particle size ~150 μu. 3 weight percent calcium carbonate (PCC, 0.07 micron) is added to the recovered powder as a flow aid (F2). The resulting powder has a ratio of 85/15 acrylic impact modifier (IM1)/inorganic compound (F) $CaCO_3$.

Comparative example 2: The dispersion of (IM1) and the slurry of inorganic filler (F1) are mixed for with the following ratio, 2.679 kg (2679 parts) of dispersion and 3.968 kg (3968 parts) of slurry, and spray dried in the conditions classically used for the latex dispersion alone. The obtained powder as a particle size ~150 µm. 5 weight percent calcium carbonate (PCC, 0.07 micron) is added to the recovered powder as a flow aid (F2). The resulting powder has a ratio of 25/75 impact modifier (IM1)/inorganic compound (F) CaCO3.

Example 1: The two acrylic dispersions and the inorganic slurry are mixed for with the following ratio, 5.305 kg (5305 parts) of impact modifier dispersion (IM1a), 0.617 kg (617 parts) of process aid (meth)acrylic copolymer (A1a) and 2.469 kg (2469 parts) of slurry of inorganic mineral filler (F1), and spray dried in the conditions classically used for the dispersion alone. The obtained powder as a particle size ~150 µm. 3 weight percent calcium carbonate (PCC, 0.07 micron) is added to the recovered powder as a flow aid (F2). The resulting powder has a ratio of 55/45 polymer/inorganic compound CaCO3.

Example 2: The dispersion of (IM1) and the slurry of inorganic filler (F1) are mixed for with the following ratio, 7.902 kg (7902 parts) of dispersion and 1.587 kg (1587 parts) of slurry, and spray dried in the conditions classically used for the latex dispersion alone. The obtained powder as a particle size ~150 µm. 3 weight percent calcium carbonate (PCC, 0.07 micron) is added to the recovered powder as a flow aid (F2). The resulting powder has a ratio of 70/30 impact modifier (IM1)/inorganic compound (F) CaCO3.

TABLE 1

Composition of powder samples

|  | IM1 [wt %] | (F1) [wt %] | Flowaid (F2) [wt %] | F = F1 + F2 [wt %] |
|---|---|---|---|---|
| Comparative example 1 | 85 | 12 | 3 | 15 |
| Comparitive example 2 | 25 | 70 | 5 | 75 |
| Example 1 | 55 | 42 | 3 | 45 |
| Example 2 | 70 | 27 | 3 | 30 |

The prepared powder samples of comparative examples and examples of table 1 are formulated at 5.5 phr in a PVC composition with PVC as thermoplastic polymer TP1. The compositions are dry blended in a Papenmeyer equipment while increasing the temperature. PVC compositions are prepared according to quantities given in table 2.

TABLE 2

PVC compositions

| components | Composition with quantities in phr |
|---|---|
| PVC (TP1) | 100 |
| 1pack CaZn | 4 |
| CaCo3 filler | 8 |
| TiO2 | 8 |
| Added polymeric composition from respective comparative examples and examples (P1) | 5.5 |

The different compositions of table 2 where process extruded in a Haake Polylab extruder. Also the fusion time of each composition was measured.

The results for fusion time are summarized in table 3.

TABLE 3

Evaluation of the fusion time of respective examples and comparative examples of table 1 during in composition of table 2

|  | Fusion time [s] |
|---|---|
| Comparative example 1 | 169 |
| Comparative example 2 | >200 |
| Example 1 | 192 |
| Example 2 | 185 |

The examples 1 and 2 still have an acceptable fusion time versus comparative example 1 and much better than comparative example 2.

TABLE 4

Evaluation of impact properties of the respective examples and comparative examples of table 1 after extrusion processing of composition of table 2.

|  | Single V-notch impact strength BSI 2783 [kJ/m2] | Double V-notch impact strength DIN 53753 [kJ/m2] | % of ductile break | Corner Weld Strength [N] |
|---|---|---|---|---|
| Comparative example 1 | 17.1 | 65.1 | 100 | 293 |
| Comparitive example 2 | 12.1 | 39.1 | 30 | — |
| Example 1 | 14.9 | 53.7 | 100 | 331 |
| Example 2 | 14.6 | 54.2 | 100 | 310 |

The example 1 and 2 show a comparative level in impact strength and a significant increase in corner weld strength.

Comparative example 1 has much lower corner weld strength.

Comparative example 2 has a worse impact performance than examples 1 and 2.

The invention claimed is:

1. A polymer composition P1 comprising:
    a) from 29 wt % to 60 wt % of an inorganic mineral compound (F), wherein the inorganic compound (F) consists of a mineral filler (F1) and a flow aid (F2), wherein the weight ratio (F1)/(F2) is at least 5/1;
    b) from 40 wt % 71 wt % of a polymeric impact modifier (IM1) which is a polymer particle having a multilayer structure comprising at least one layer (IM1L1) having a glass transition temperature below 0° C. and at least another layer (IM1L2) having a glass transition temperature over 45° C., wherein the weight ratio of layer (IM1L1)/layer (IM1L2) in the multistage polymer is in a range by weight between 85/15 and 97/3;
wherein the two components of a) and b) add up to 100 wt %, the ratio of the two components a) and b) being calculated only from the sum of these two components,
and wherein polymer composition P1 is a powder having volume median particle size D50 between 1 µm and 500 µm.

2. The composition according to claim 1 comprising
    a) between 31 wt % and 59 wt % of an inorganic compound (F),
    b) between 41 wt % and 69 wt % a polymeric impact modifier (IM1).

3. The composition according to claim 1 comprising
    a) between 33 wt % and 58 wt % of an inorganic compound (F), b) between 42 wt % and 67 wt % a polymeric impact modifier (IM1).

4. The composition according to claim 1 comprising
a) between 40 wt % and 55 wt % of an inorganic compound (F),
b) between 45 wt % and 60 wt % a polymeric impact modifier (IM1).

5. The composition according to claim 1 comprising
a) between 42 wt % and 47 wt % of an inorganic compound (F),
b) between 53 wt % and 58 wt % a polymeric impact modifier (IM1).

6. The composition according to claim 1, wherein each powder particle comprises the compounds of a) and b).

7. The composition according to claim 1, wherein a sample of 1 g or less taken from a quantity of 1 kg of the polymeric composition P1 has a variation of less than 30% relative to the global composition of P1 concerning the weight ratio of the two respective components of a) and b).

8. The composition according to claim 1, wherein the weight ratio of layer (IM1L1)/layer (IM1L2) in the multi-stage polymer is at least 86/14.

9. The composition according to claim 1, wherein the weight ratio of layer (IM1L1)/layer (IM1L2) in the multi-stage polymer is in a range by weight between 86/14 and 97/3.

10. The composition according to claim 1, wherein layer IM1L1 comprises polymer L1 and the polymer L1 presents more than 85 wt % of the polymeric impact modifier (IM1).

11. The composition according to claim 1, wherein layer IM1L1 comprises polymer L1 and the polymer L1 presents more than 86 wt % of the polymeric impact modifier (IM1).

12. The composition according to claim 1, wherein layer IM1L1 comprises polymer L1 and the polymer (L1) has a glass transition temperature below 0° C. and is a (meth) acrylic polymer comprising at least 50 wt % of monomers from alkyl acrylates.

13. The composition according to claim 1 wherein at least a part of the mineral filler (F1) is a mineral filler chosen from the group consisting of calcium carbonate, calcinated clay, silica (fumed or precipitated), clay, Montmorillonite (nano-clay), zeolite, perlite, and titanium dioxide.

14. The composition according to claim 1 wherein the mineral filler (F1) is calcium carbonate.

15. A process for preparing the polymeric composition P1 of claim 1, said process comprising the step of:
blending the components of a) and b), while the component of b) and at least 83.33 wt % of compound a) are in form of a dispersion in aqueous phase during the blending step.

16. The process according to claim 15, wherein the polymeric composition P1 comprises,
a) between 31 wt % and 59 wt % of an inorganic compound (F), and
b) between 41 wt % and 69 wt % a polymeric impact modifier (IM1).

17. The process according to claim 15, wherein said process comprises the steps of:
i) blending the two components of a) and b), while the two components are in form of a dispersion in aqueous phase during the blending step, and
ii) drying the blend obtained in step i).

18. The process for preparing a polymeric composition P2 comprising polymer composition P1 according to claim 1,
said polymeric composition P2 comprises also
d) a thermoplastic polymer TP1,
said process comprises the step of:
blending the compositions P1 and the thermoplastic polymer TP1.

19. An article comprising processed polymer composition P2 according to claim 18, wherein the article is a profile, a pipe, a siding, a foam, a film, a sheet, a flooring film or sheet.

* * * * *